US012754798B2

(12) United States Patent
Tsai

(10) Patent No.: US 12,754,798 B2
(45) Date of Patent: Oct. 6, 2026

(54) MEMORY DEVICE AND IN-MEMORY COMPUTING METHOD FOR BINARIZED NEURAL NETWORK

(71) Applicant: MACRONIX International Co., Ltd., Hsinchu (TW)

(72) Inventor: Wen-Che Tsai, Hsin-Chu City (TW)

(73) Assignee: MACRONIX International Co., Ltd., Hsinchu (TW)

( * ) Notice: Subject to any disclaimer, the term of this patent is extended or adjusted under 35 U.S.C. 154(b) by 29 days.

(21) Appl. No.: 18/930,951

(22) Filed: Oct. 29, 2024

(65) Prior Publication Data

US 2026/0119314 A1 Apr. 30, 2026

(51) Int. Cl.

| | |
|---|---|
| ***G06F 11/10*** | (2006.01) |
| ***G06F 11/00*** | (2006.01) |
| ***G06N 3/04*** | (2023.01) |
| ***G06N 3/08*** | (2023.01) |

(52) U.S. Cl.

CPC ........ *G06F 11/1016* (2013.01); *G06F 11/102* (2013.01); *G06F 11/1068* (2013.01); *G06N 3/04* (2013.01); *G06N 3/08* (2013.01)

(58) Field of Classification Search

CPC ............... G06F 11/1016; G06F 11/102; G06F 11/1068; G06N 3/0464; G06N 3/063; G06N 3/082; G06N 3/08; G06N 3/048

See application file for complete search history.

(56) References Cited

U.S. PATENT DOCUMENTS

| | | | | |
|---|---|---|---|---|
| 11,328,204 | B2 | 5/2022 | Choi et al. | |
| 11,403,169 | B2 * | 8/2022 | Fackenthal | G06F 11/102 |
| 11,625,584 | B2 * | 4/2023 | Kumar | G06F 7/5443 706/15 |
| 11,915,128 | B2 * | 2/2024 | Nakahara | G06N 3/082 |

(Continued)

FOREIGN PATENT DOCUMENTS

| | | | |
|---|---|---|---|
| CN | 110414677 | A | 11/2019 |
| TW | 202125286 | A | 7/2021 |
| TW | 202439197 | A | 10/2024 |

OTHER PUBLICATIONS

Notice of allowance of Taiwan Counterpart Application, issued on Jul. 15, 2025, p. 1-p. 3.

(Continued)

*Primary Examiner* — Justin R Knapp

(74) *Attorney, Agent, or Firm* — J.C. PATENTS

(57) ABSTRACT

A memory device and an in-memory computing method are provided. The memory device is, for example, a 3D NAND flash memory and provides a storage media with high-performance and high-capacity. In the memory device, an input parser provides initial address information and initial layer activation data. A readout data sensor and comparator reads initial data corresponding to the initial address information from a memory array, and compares the initial layer activation data with a plurality of weight data in the initial data bit by bit respectively to generate a plurality of first comparative data. An error bit detector analyzes the first comparative data to generate a plurality of first analysis data. An operation circuit uses an activation function to operate each first analysis data and a corresponding second analysis data to provide intermediate layer activation data to the input parser.

19 Claims, 8 Drawing Sheets

(56) References Cited

U.S. PATENT DOCUMENTS

| | | | | |
|---|---|---|---|---|
| 12,217,160 | B1 * | 2/2025 | Ko | G06N 3/048 |
| 12,488,228 | B2 * | 12/2025 | Seo | G06N 3/063 |
| 2022/0147792 | A1 | 5/2022 | Jiao et al. | |

OTHER PUBLICATIONS

Matthieu Courbariaux et al., "Binarized Neural Networks: Training Neural Networks with Weights and Activations Constrained to +1 or −1", arXiv:1602.02830v3 [cs.LG], Mar. 2016, pp. 1-11.

Kota Ando et al., "BRein Memory: a Single-Chip Binary/Ternary Reconfigurable in-Memory Deep Neural Network Accelerator Achieving 1.4 TOPS at 0.6 W", IEEE Journal of Solid-State Circuits, vol. 53, Apr. 2018, pp. 983-994.

HM. Cao et al., "An efficient built-in error detection methodology with fast page-oriented data comparison in 3D NAND flash memories", Electronics Letters, vol. 58, Jun. 2022, pp. 1-4.

Sung-Tae Lee et al., "High-Density and Highly-Reliable Binary Neural Networks Using NAND Flash Memory Cells as Synaptic Devices", 2019 IEEE International Electron Devices Meeting (IEDM), Feb. 2020, pp. 1-4.

Abu Sebastian et al., "Temporal correlation detection using computational phase-change memory", Nature Communications, Oct. 2017, pp. 1-10.

Chun-Hsiung Hung et al., "3D stackable vertical-gate BE-SONOS NAND flash with layer-aware program-and-read schemes and wave-propagation fail-bit-detection against cross-layer process variations", 2013 Symposium on VLSI Technology, Aug. 2013, pp. 1-2.

* cited by examiner

MEMORY DEVICE AND IN-MEMORY COMPUTING METHOD FOR BINARIZED NEURAL NETWORK

BACKGROUND

Technical Field

The present disclosure relates to a computing technology, and in particular, to a memory device and an in-memory computing method.

Description of Related Art

With the advancement of AI operation, the scope of AI operational applications has become increasingly extensive. For instance, neural network models are utilized for image analysis, speech analysis, natural language processing, and other neural network operations. Consequently, various technological domains continue to invest in AI research, development, and application. Among the diverse neural network models, Binarized Neural Networks (BNNs), which quantize weights and activations to +1 and −1, are deemed to significantly reduce storage requirements and computational complexity. However, the volume of data employed in the hidden layers remains substantial, still necessitating considerable computational time.

A technology currently under development is known as in-memory computation. Through in-memory computation, logical operations and processing may be performed within the memory itself prior to output, significantly reducing the time required for computations. Consequently, a critical area of research in this field is how to enable computations within memory while maintaining the existing memory structure unaltered or with minimal modifications thereto.

SUMMARY

The present disclosure provides a memory device and an in-memory computing method, enabling AI operations to be performed within the memory using existing memory structures.

The memory device of the present disclosure includes an input parser, a memory array, a readout data sensor and comparator, an error bit detector, and an operation circuit. The input parser is configured to receive input data and provide initial address information and initial layer activation data based on the input data. The memory array is coupled to the input parser. The readout data sensor and comparator is coupled to the input parser and the memory array, and are configured to, in the case that the initial address information is provided by the input parser, read the initial data corresponding to the initial address information from the memory array, and compare the initial layer activation data with multiple weight data in the initial data bit by bit respectively to generate multiple first comparative data. The error bit detector is coupled to the readout data sensor and comparator, and is configured to analyze the first comparative data to generate multiple first analysis data. The operation circuit is coupled to the error bit detector and the input parser, and is configured to use an activation function to operate each first analysis data and the corresponding second analysis data to provide intermediate layer activation data to the input parser.

The in-memory computing method of the present disclosure includes the following steps: receiving input data, and providing initial address information and initial layer activation data according to the input data; in the case of providing initial address information, reading the initial data corresponding to the initial address information from the memory array, and comparing the initial layer activation data with multiple weight data in the initial data bit by bit respectively to generate multiple first comparative data; analyzing the first comparative data to generate multiple first analysis data; and utilizing an activation function to operate each first analysis data and the corresponding second analysis data to provide intermediate layer activation data.

Based on the foregoing, the memory device and the in-memory computing method of the present disclosure may effectively implement operations related to binary neural networks within the memory device of the present disclosure without requiring substantial redesign of existing memory structures. Such method not only effectively reduces the time required for computations but also decreases design costs.

In order to make the above-mentioned features and advantages of the present disclosure more obvious and easy to understand, embodiments are given below and described in detail with reference to the attached drawings.

DESCRIPTION OF THE EMBODIMENTS

The memory device of the present disclosure may be, for example, a three-dimensional NAND flash memory, which is characterized by high performance and high capacity. Please refer to FIG. 1, which shows the equivalent circuit of the block 10 of the memory device in a three-dimensional manner. The memory cell M0 is configured in the XYZ three-dimensional coordinate system of the block 10, but the present disclosure is not limited thereto. In this example, the block 10 may be divided into four sub-blocks Sub0 to Sub3, and each sub-block Sub0 to Sub3 may control operations independently.

Figure 1:
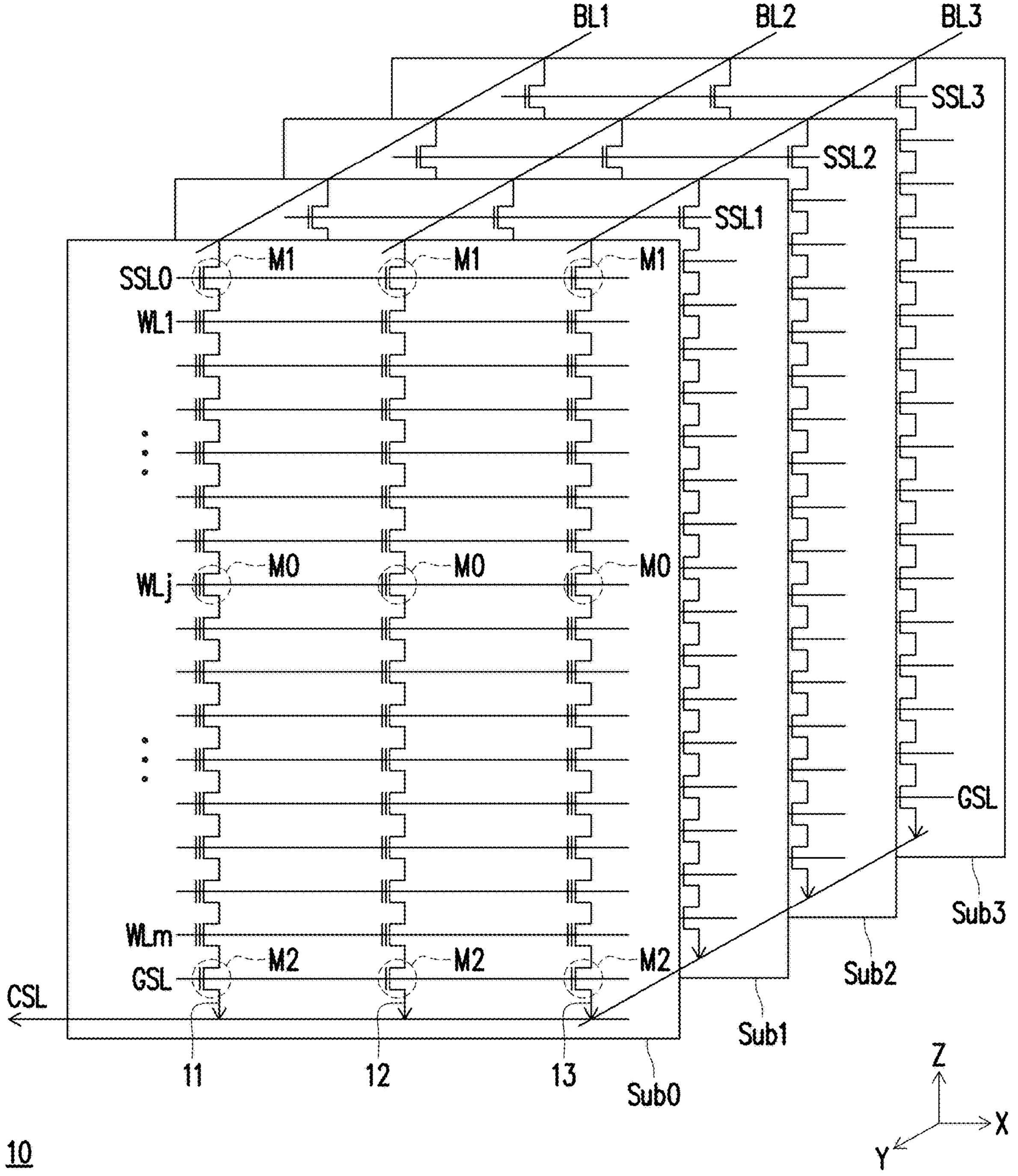
FIG. 1 is a schematic three-dimensional structural diagram of a memory block in a memory device according to an embodiment of the present disclosure.

Taking sub-block Sub0 as an example, in FIG. 1, each string 11, 12, 13 includes multiple memory cells M0 connected in series along the Z direction. Each memory cell M0 on each string 11, 12, 13 corresponds to one word line WLj of the word lines WL1 to WLm. The word line WLj may be a word line layer in the XY plane. In this embodiment, j is any positive integer greater than or equal to 1 and less than or equal to m. The memory cell M1 may be configured as a string selection transistor coupled to the string selection line SSL0, and the memory cell M2 may be configured as a ground selection transistor coupled to the ground selection line GSL. The string selection transistor and the ground selection transistor are respectively arranged on opposite sides of the multiple memory cells M0 on each string 11, 12, and 13. In this example, the strings 11, 12, and 13 coupled on the same plane (e.g., the plane defined by the X direction and the Z direction) of the same string selection line SSL0 may be defined as the sub-block Sub0.

Strings 11, 12, and 13 are respectively connected to bit lines BL1, BL2, and BL3 through corresponding string selection transistors on the string selection line SSL0. In different sub-blocks, strings of the same columns are connected to the same bit lines in the Y direction. The string selection line SSL0 may be a conductor or layer formed over the top of topmost word line WL1. Each string 11, 12, 13 may be connected to the same common source line CSL through a corresponding ground selection transistor on the ground selection line GSL. The ground selection line GSL may be a conductor or layer formed under the bottom of the bottommost word line WLm. The common source line CSL may be a conductive layer formed over the substrate of the memory device.

In the block 10, the string selection line SSL0 of the sub-block Sub0, the string selection line SSL1 of the sub-block Sub1, the string selection line SSL2 of the sub-block Sub2, and the string selection line SSL3 of the sub-block Sub3 may be located on the same conductive layer, but separated into separate stripes. Each separate stripe on the same conductive layer may independently control the operation of a corresponding sub-block within the block 10.

In an embodiment, the memory cell M0 coupled to the same word line WLj or word line layer in the sub-block Sub0 may be defined as a page (in a single level cell (SLC) mode) or three pages (in triple level cell (TLC) mode). In TLC mode, the three pages include high page, middle page and low page. The same voltage is applied to the memory cell M0 on the same word line WLj. Each word line WLj may be connected to a driver circuit, such as an X decoder (or scan driver).

In an embodiment, within the sub-block Sub0, one or more dummy lines or layers (not shown) are provided between the string selection line SSL0 and the corresponding topmost word line WL1 and/or are provided between the ground selection line GSL and the bottommost word line WLm. In another embodiment, one or more dummy lines or layers (not shown) are provided in the middle portion of the strings 11, 12, 13 within the sub-block Sub0.

Figure 2:
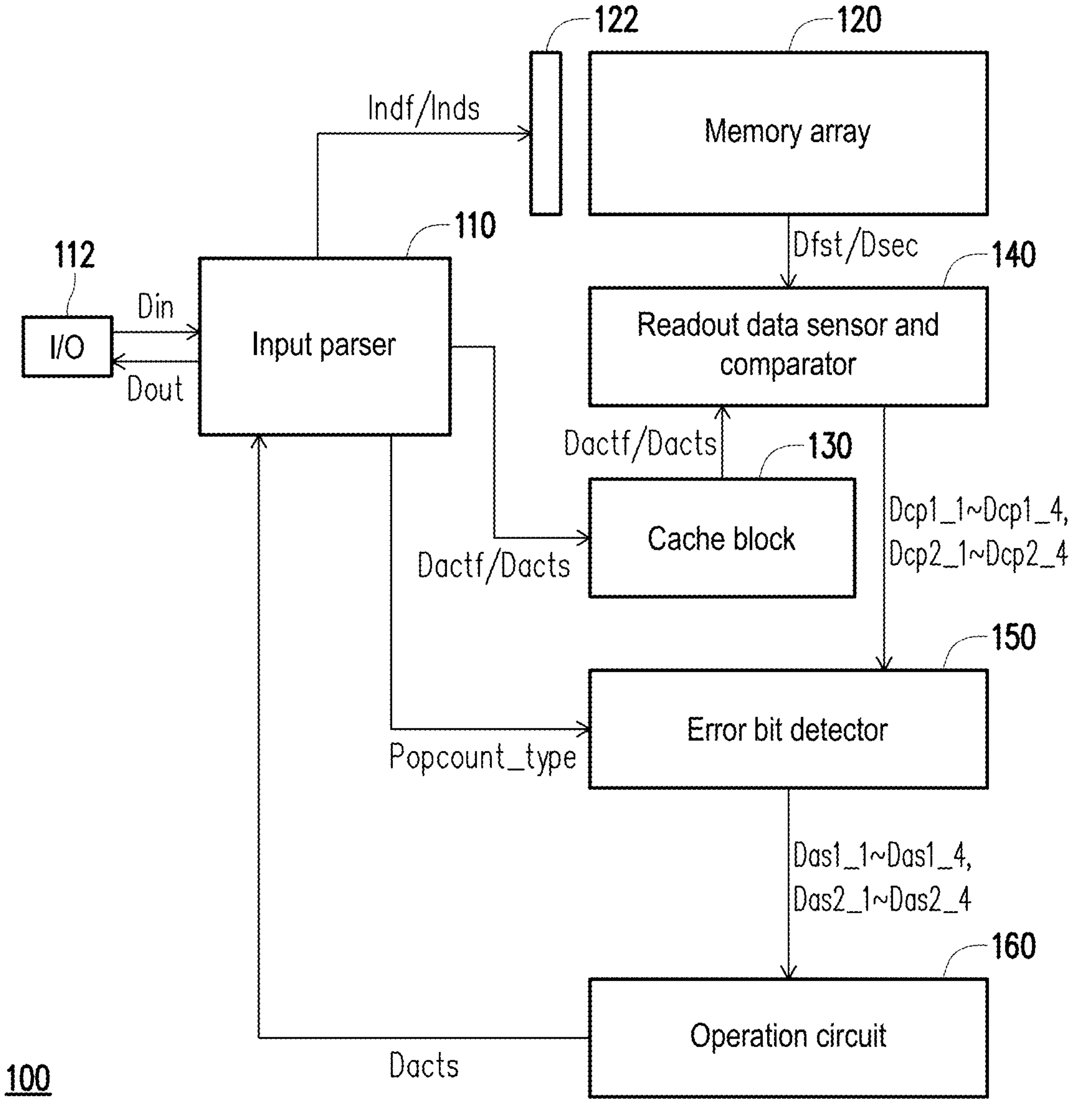
FIG. 2 is a schematic block diagram of a memory device according to an embodiment of the present disclosure.

The structure and operation of the memory device of this embodiment will be described below. Please refer to FIG. 2. For example, the memory device 100 may internally perform related operations of the hidden layers of the binary neural network, which includes an input parser 110, a memory array 120, a cache block 130, a readout data sensor and comparator 140, an error bit detector 150 and an operation circuit 160.

The input parser 110 is, for example, a state machine, a programmable general-purpose or special-purpose microprocessor, a digital signal processor, a programmable controller, a special application integrated circuit, a programmable logic device or other similar devices or combinations of these devices. The input parser 110 may receive the input data Din from the input/output terminal (I/O) 112. The input data Din includes, for example, the total number of the hidden layers of the binary neural network currently being executed, the initial address information Indf indicating the storage address of the weights and bias values required for the first hidden layer to perform operations, and the initial layer activation data Dactf as the input activation of the first hidden layer and so on. The input parser 110 may provide the initial address information Indf to the address decoder 122 of the memory array 120 and the initial layer activation data Dactf to the cache block 130 according to the input data Din. In addition, the input parser 110 may further provide the configuration flag Popcount_type corresponding to the first hidden layer to the error bit detector 150.

Figure 3:
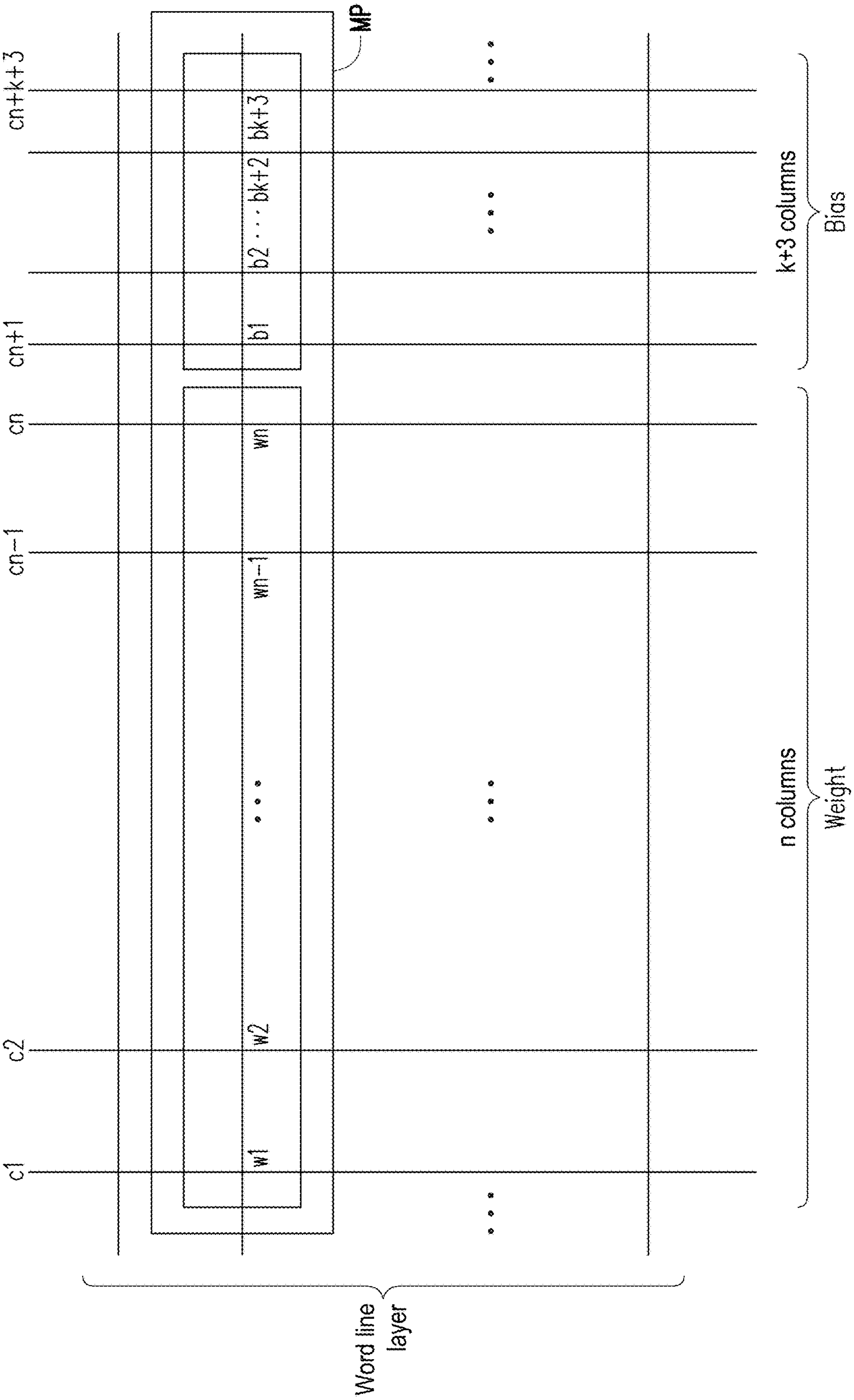
FIG. 3 is a schematic structural diagram of a memory page according to an embodiment of the present disclosure.
Figure 4:
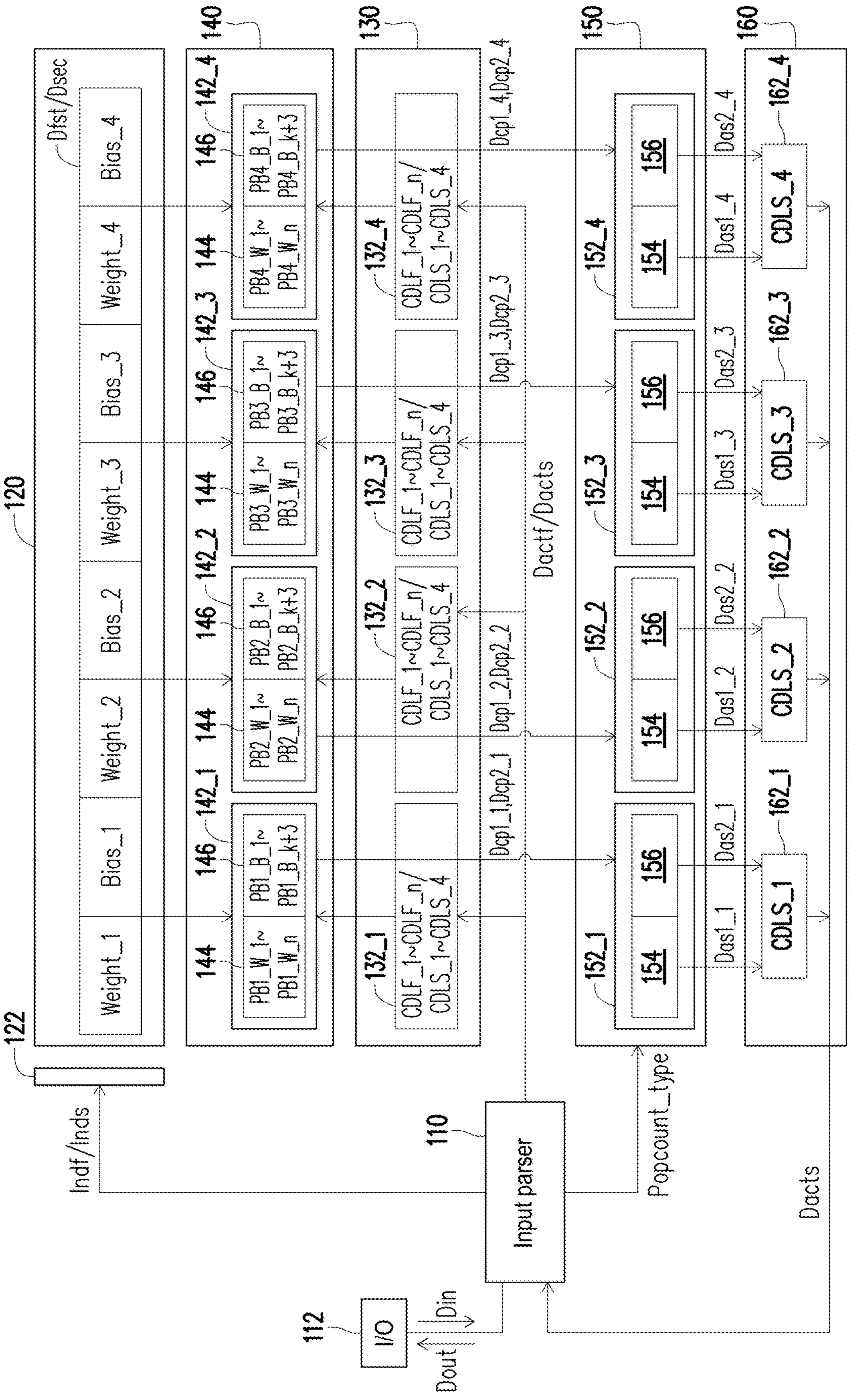
FIG. 4 is a schematic diagram of an in-memory computation according to the embodiment of FIG. 1.

The memory array 120 includes, for example, multiple memory cells arranged in a three-dimensional array. The address decoder 122 of the memory array 120 is coupled to the input parser 110. In this embodiment, the initial address information Indf may be one or more pages of address information, and the address decoder 122 may be a row address decoder. The address decoder 122 may open one or more memory pages for storing the weight data Weight and the bias value data Bias required for the first hidden layer to perform operations in the memory array 120 according to the initial address information Indf. For example, as shown in FIG. 3, in the memory page MP of memory array 120, the memory cells on columns c1 to cn store weight bits w1 to wn, and the memory cells on the columns cn+1 to cn+k+3 store the bias value bits b1 to bk+3. The address decoder 122 may open the memory page MP according to the initial address information Indf, so that the memory array 120 combines the weight bits w1 to wn to form the corresponding weight data Weight and outputs the same, and the memory array 120 combines the bias value bits b1 to bk+3 to form the corresponding bias value data Bias and outputs the same. In this embodiment, the weight data Weight may be any of the weight data Weight_1 to Weight_4 in the initial data Dfst corresponding to the initial address information Indf or in the intermediate data Dsec corresponding to the intermediate address information Inds described later. The bias value data Bias may be used as any one of the bias value data Bias_1 to Bias_4 in the initial data Dfst corresponding to the initial address information Indf or the intermediate data Dsec corresponding to the intermediate address information Inds (as shown in FIG. 4). The data length of the weight data Weight is n bits, and n is equivalent to the number of nodes in the previous layer (input layer or hidden layer) of the hidden layer currently being operated. The data length of the bias value data Bias is k+3 bits, and must comply with the limitation of $2^k$>=n. It should be noted that although the bias value bit b1 is stored in a column adjacent to the weight bit wn in FIG. 3, the present disclosure is not limited thereto.

The cache block 130 is coupled between the input parser 110 and the readout data sensor and comparator 140. The cache block 130 is composed of, for example, one or more latches. As shown in FIG. 4, the cache block 130 includes buffer blocks 132_1 to 132_4. The initial layer activation data Dactf consists of activation value bits CDLF_1 to CDLF_n. The cache block 130 may store the initial layer activation data Dactf in the buffer blocks 132_1 to 132_4 respectively, and provide the same to the readout data sensor and comparator 140.

The readout data sensor and comparator 140 are coupled to the cache block 130 and the memory array 120. In the case that the initial address information Indf is provided by the input parser 110, the readout data sensor and comparator 140 may read the initial data Dfst corresponding to the initial address information Indf from the memory array 120, and compare the initial layer activation data Dactf with the weight data Weight_1 to Weight_4 in the initial data Dfst bit by bit respectively to generate the first comparative data Dcp1_1 to Dcp1_4. For example, as shown in FIG. 4, the initial data Dfst stored in the memory array 120 includes 4 weight data Weight_1 to Weight_4 and 4 bias value data Bias_1 to Bias_4. Each weight data Weight_1 to Weight_4 is composed of corresponding weight bits w1 to wn. The data length of each weight data Weight_1 to Weight_4 is equal to the data length (equal to n bits) of the initial layer activation data Dactf. In addition, each bias value data Bias_1 to Bias_4 is composed of corresponding bias value bits b1 to bk+3, which may represent an integer value.

In FIG. 4, the readout data sensor and comparator 140 includes page buffer groups 142_1 to 142_4. Each of the page buffer groups 142_1 to 142_4 includes a first page buffer 144 and a second page buffer 146. The first page buffer 144 in the page buffer group 142_1 may store the weight data Weight_1 and the initial layer activation data Dactf, and compare the stored data bit by bit to generate the first comparative data Dcp1_1. Specifically, the readout data sensor and comparator 140 may perform an XNOR operation on the corresponding two bits in the initial layer activation data Dactf and the weight data Weight_1. The comparison result of the XNOR operation is equal to the logical value 1, which means the comparison result is the same. In contrast, the comparison result of the XNOR operation is equal to the logical value 0, indicating that the comparison result is different. In this way, the readout data sensor and comparator 140 may combine the bits PB1_W_1 to PB1_W_n generated according to the comparison result of performing the XNOR operation on the initial layer activation data Dactf and the weight data Weight_1 to form the first comparative data Dcp1_1 and store the same in the first page buffer 144 in the page buffer group 142_1.

In addition, the second page buffer 146 in the page buffer group 142_1 may also store the bias value data Bias_1 in the initial data Dfst and the bit data composed of bit 1 (a bit with a logical value of 1), and compare the stored data bit by bit to generate the second comparative data Dcp2_1. In this way, the readout data sensor and comparator 140 may combine the bits PB1_B_1 to PB1_B_k+3 generated according to the comparison result of performing the XNOR operation on the bit data composed of bit 1 and the bias value data Bias_1 to form the second comparative data Dcp2_1 and store the same in the second page buffer 146 in the page buffer group 142_1. Regardless of whether it is a logical value 1 or a logical value 0, the value after performing the XNOR operation with bit 1 remains unchanged. Therefore, the second comparative data Dcp2_1 is essentially the same as the bias value data Bias_1.

Similarly, the readout data sensor and comparator 140 may combine the bits PB2_W_1 to PB2_W_n, bits PB3_W_1 to PB3_W_n, and bits PB4_W_1 to PB4_W_n generated according to the comparison result of performing the XNOR operation on the initial layer activation data Dactf and the weight data Weight_2 to Weight_4 respectively to form the first comparative data Dcp1_2 to Dcp1_4 and store the same in the first page buffer 144 in the page buffer group 142_2 to 142_4. The readout data sensor and comparator 140 may combine the bits PB2_B_1 to PB2_B_k+3, bits PB3_B_1 to PB3_B_k+3, and bits PB4_B_1 to PB4_B_k+3 generated according to the comparison result of performing the XNOR operation on the bit data consisting of bit 1 and the bias value data Bias_2 to Bias_4 respectively to form the second comparative data Dcp2_2 to Dcp2_4 and store the same in the second page buffer 146 in the page buffer group 142_2 to 142_4. The second comparative data Dcp2_2 to Dcp2_4 are substantially the same as the bias value data Bias_2 to Bias_4 respectively.

The error bit detector 150 is coupled to the readout data sensor and comparator 140. The error bit detector 150 may analyze the first comparative data Dcp1_1 to Dcp1_4 obtained from the readout data sensor and comparator 140 according to the configuration flag Popcount_type obtained from the input parser 110, thereby generating the first analysis data Das1_1 to Das1_4. Specifically, in FIG. 4, the error bit detector 150 includes population count buffer groups 152_1 to 152_4. Each of the population count buffer groups 152_1 to 152_4 includes a first population count buffer 154 and a second population count buffer 156. The first population count buffer 154 in the population count buffer group 152_1 may store the first comparative data Dcp1_1, and perform a count of the number of bit 1 in the stored first comparative data Dcp1_1 based on the configuration flag Popcount_type, for example, set to a logical value of 1 (the first configuration flag), to generate the first analysis data Das1_1 representing the counting results (the number of bit 1).

In addition, the second population count buffer 156 in the population count buffer group 152_1 may store the second comparative data Dcp2_1, and output the stored second comparative data Dcp2_1 as the corresponding second analysis data Das2_1 according to the configuration flag Popcount_type, for example, set to a logic value of 0 (the second configuration flag).

Similarly, the first population count buffer 154 in the population count buffer groups 152_2 to 152_4 may count the number of bit 1 in the stored first comparative data Dcp1_2 to Dcp1_4, respectively, based on the configuration flag Popcount_type, for example, set to a logical value of 1, to generate the first analysis data Das1_2 to Das1_4 representing the counting results (the number of bit 1). The second population count buffer 156 in the population count buffer groups 152_2 to 152_4 may output the stored second comparative data Dcp2_2 to Dcp2_4 as the second analysis data Das2_2 to Das2_4, respectively, based on the configuration flag Popcount_type, for example, set to a logical value of 0. The second analysis data Das2_1 to Das2_4 are substantially identical to the bias value data Bias_1 to Bias_4, respectively.

The operation circuit 160 is coupled to the error bit detector 150 and the input parser 110. The operation circuit 160 is configured to utilize an activation function to perform operations on the first analysis data Das1_1 to Das1_4 in conjunction with the second analysis data Das2_1 to Das2_4, respectively, to provide the intermediate layer activation data Dacts to the input parser 110. The intermediate layer activation data Dacts consists of the activation value bits CDLS_1 to CDLS_4. Specifically, the operation circuit 160 may multiply the value of the first analysis data Das1_1 by 2, then add the value of the second analysis data Das2_1 to obtain cumulative data, and subsequently input said cumulative data into the activation function for operation. When the cumulative data is greater than or equal to 0, the operation circuit 160 generates an activation value bit CDLS_1 with a logical value of 1. Conversely, when the cumulative data is less than 0, the operation circuit 160 generates an activation value bit CDLS_1 with a logical value of 0, and the resultant activation value bit is then stored in the operation buffer 162_1.

Similarly, the operation circuit 160 may respectively multiply the values of the first analysis data Das1_2 to Das1_4 by 2, and then add the respective values of the second analysis data Das2_2 to Das2_4 to obtain multiple cumulative data. These cumulative data are then input into an activation function to generate activation value bits CDLS_2 to CDLS_4, which are subsequently stored in the operation buffers 162_2 to 162_4. Through this process, the operation circuit 160 may combine the generated activation value bits CDLS_1 to CDLS_4 to form the intermediate layer activation data Dacts, which is then provided to the input parser 110.

The input parser 110 may set the initial value of the layer count value to 1. Whenever the intermediate layer activation data Dacts are received from the operation circuit 160, the input parser 110 may increment the layer count value (add 1), and then determine whether the layer count value is greater than the total number of hidden layers.

When the layer count value is greater than the total number of hidden layers, it means that the operations of all hidden layers have ended. Under the circumstances, the input parser 110 may provide the current intermediate layer activation data Dacts as the output data Dout to the input and output terminal 112 for subsequent operations of output layer.

When the layer count value is not greater than the total number of hidden layers, it means that the operation of the hidden layer has not yet ended. Under the circumstances, the input parser 110 may, for example, find the intermediate address information Inds corresponding to the current layer count value based on a pre-stored lookup table, and provide the intermediate address information Inds to the address decoder 122 of the memory array 120. In the meantime, the input parser 110 may provide the current intermediate layer activation data Dacts to the cache block 130 as the input activation value of the next hidden layer. Moreover, the input parser 110 may also provide the configuration flag Popcount_type corresponding to the current layer count value to the error bit detector 150.

The cache block 130 may store the intermediate layer activation data Dacts in the buffer blocks 132_1 to 132_4 respectively, and provide them to the readout data sensor and comparator 140.

In the case that the intermediate address information Inds is provided by the input parser 110, the readout data sensor and comparator 140 may read the intermediate data Dsec corresponding to the current intermediate address information Inds from the memory array 120, and compare the current intermediate layer activation data Dacts with the weight data Weight_1 to Weight_4 in the intermediate data Dsec bit by bit respectively to generate the first comparative data Dcp1_1 to Dcp1_4 corresponding to the current layer count value. For example, as shown in FIG. 4, the intermediate data Dsec stored in the memory array 120 further includes 4 weight data Weight_1 to Weight_4 and 4 bias value data Bias_1 to Bias_4. The readout data sensor and comparator 140 may perform the same operation on the intermediate data Dsec and the intermediate layer activation data Dacts as the initial data Dfst and the initial layer activation data Dactf, thereby generating the first comparative data Dcp1_1 to Dcp1_4 and the second comparative data Dcp2_1 to Dcp2_4 corresponding to the current layer count value.

Next, after the new intermediate layer activation data Dacts are generated through the operation of the error bit detector 150 and the operation circuit 160, the input parser 110 may determine again whether the incremented layer count value is greater than the total number of hidden layers, so as to continue processing.

It should be noted that, in order to facilitate understanding, the initial data Dfst or the intermediate data Dsec including 4 weight data Weight_1 to Weight_4 and 4 bias value data Bias_1 to Bias_4 are utilized for description in FIG. 4, which is applicable to the situation where the hidden layer currently being operated has 4 nodes, but the present disclosure is not limited thereto. Those skilled in the art may, based on the teachings of the present disclosure, deduce the number of weight data and bias value data in the initial data Dfst or intermediate data Dsec to be less or more depending on the number of nodes in the actual hidden layer.

Incidentally, the operation of each node in the hidden layer of the binary neural network includes the following Formula 1:

$$\text{Formula } 1 = \sum_{i=1}^{n} (wi \times xi) + \text{Bias\_o}$$

wherein wi is the weight, xi is the activation value, Bias_o is the original bias value of the binary neural network, and n is equal to the number of nodes in the previous layer of the hidden layer currently being operated.

Table 1 shows the operation method of wi×xi in Formula (1).

TABLE 1

| | | Activation value xi | |
|---|---|---|---|
| | | −1 | 1 |
| Weight wi | −1 | 1 | −1 |
| | 1 | −1 | 1 |

Table 2 shows the manner in which the readout data sensor and comparator 140 perform the XNOR operation on the activation value bits and the weight bits.

TABLE 2

| | | Activation value bit | |
|---|---|---|---|
| | | 0 | 1 |
| Weight bit | 0 | 1 | 0 |
| | 1 | 0 | 1 |

Upon comparing Table 1 and Table 2, it may be observed that the tables would be equivalent if the value −1 in the binary neural network operation of Table 1 were to be replaced with bit 0 (a bit with a logical value of 0). Therefore, based on this principle, the operation of wi×xi may be implemented through the use of the readout data sensor and comparator 140.

In binary neural network operations, given that each wi×xi operation results in either +1 or −1, the cumulative sum of $$\Sigma_{i=1}^{n}(wi \times xi)$$

is equivalent to the difference between the count of wi×xi operations yielding +1 and those yielding −1. In the event of substituting −1 with bit 0 in binary neural network operations, the following Formula 2 shall be applicable:

$$\text{Formula 2: } \sum_{i=1}^{n} (wi \times xi) + \text{Bias\_o} = Popcount(1) - Popcount(0) + \text{Bias\_o} = Popcount(1) - (n - Popcount(1)) + \text{Bias\_o} = 2 \times Popcount(1) + (\text{Bias\_o} - n) = 2 \times Popcount(1) + \text{Bias}$$

wherein, Popcount(1) represents the number of bit 1 in the operation result, which may correspond to the first analysis data Das1_1 to Das1_4 generated by the error bit detector 150. The Popcount(0) represents the number of bit 0 in the operation result. Bias refers to the bias value data stored in the memory array 120 of the present disclosure, which may correspond to the second analysis data Das2_1 to Das2_4 generated by the error bit detector 150. Consequently, the operation of $$\Sigma_{i=1}^{n} (wi \times xi) + \text{Bias\_o}$$

may be implemented through the error bit detector 150 and the operation circuit 160.

In addition to the operation of the activation function performed by the operation circuit 160, the memory device 100 of the present disclosure may internally perform related operations of the hidden layers of the binary neural network.

In addition, as can be seen from FIG. 3 and FIG. 4, the present disclosure does not significantly change the existing memory structure. The readout data sensor and comparator 140 and the error bit detector 150 are also present in the existing memory structure. Therefore, the memory device 100 of the present disclosure does not need to significantly redesign the existing memory structure, and may be applied to any existing memory that already includes a "program-verify module" and a "fail-bit counting module".

Figure 5:
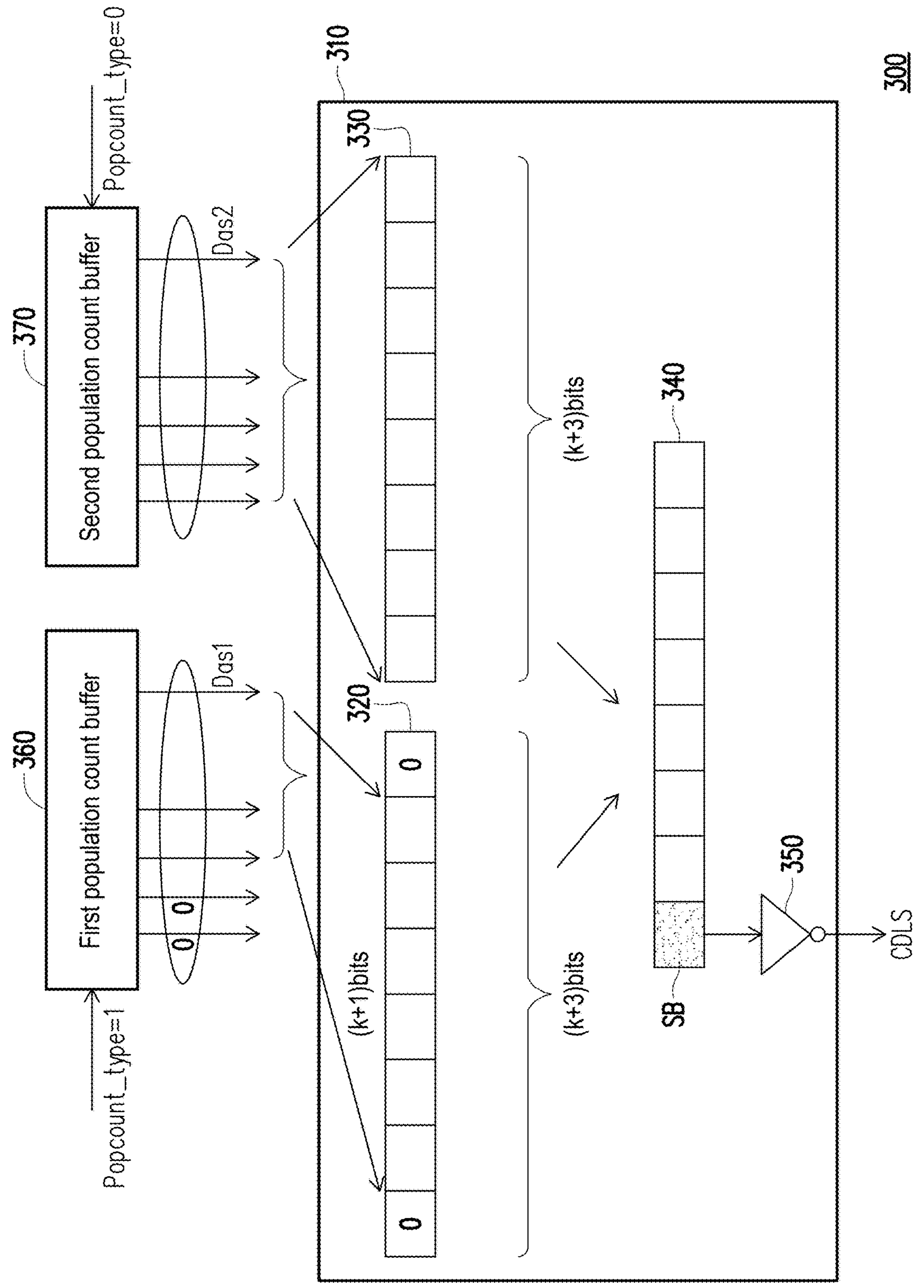
FIG. 5 is a partial structural diagram of an operation circuit according to an embodiment of the present disclosure.

The following is an example to illustrate the implementation details of the operation circuit. Referring to FIG. 5, the operation circuit 300 includes multiple adder circuits 310. As shown in FIG. 5, each adder circuit 310 includes a summand buffer 320, an addend buffer 330, a sum buffer 340 and a first inverter 350. The summand buffer 320 may obtain the first analysis data Das1 from the corresponding first population count buffer 360, and store the first analysis data Das1 with a left shift of 1 bit. Therefore, the value stored in the summand buffer 320 is equal to the value of the first analysis data Das1 multiplied by 2.

The addend buffer 330 may obtain the second analysis data Das2 from the corresponding second population count buffer 370, and directly store the second analysis data Das2.

The sum buffer 340 is coupled to the summand buffer 320 and the addend buffer 330. The sum buffer 340 may add the data stored in the summand buffer 320 and the data stored in the addend buffer 330 to obtain cumulative data and store them.

The first inverter 350 is coupled to the sum buffer 340. The first inverter 350 may invert the highest sign bit SB in the cumulative data stored in the sum buffer 340 to generate the activation value bit CDLS. When the cumulative data is greater than or equal to 0 (the sign bit SB is a logic value 0), the activation value bit CDLS with a logic value of 1 may be generated. When the cumulative data is less than 0 (the sign bit SB is a logic value 1), the activation value bit CDLS with a logic value of 0 may be generated. The activation value bit CDLS will be equivalent to the operation result obtained by inputting the cumulative data into the activation function. In this way, the operation circuit 300 may combine multiple activation value bits CDLS generated by the multiple adder circuits 310 to form the intermediate layer activation data Dacts.

It is worth mentioning that in FIG. 5, due to the need for addition, the data length of the summand buffer 320 is equal to the data length of the addend buffer 330, both equal to k+3 bits. Furthermore, since the summand buffer 320 needs to shift the first analysis data Das1 to the left by 1 bit before storing it, and the highest bit is the sign bit, the data length of the first analysis data Das1 needs to be less than k+1 bits. Under this premise, the above-mentioned limitation of $2^k$>=n will occur.

Figure 6:
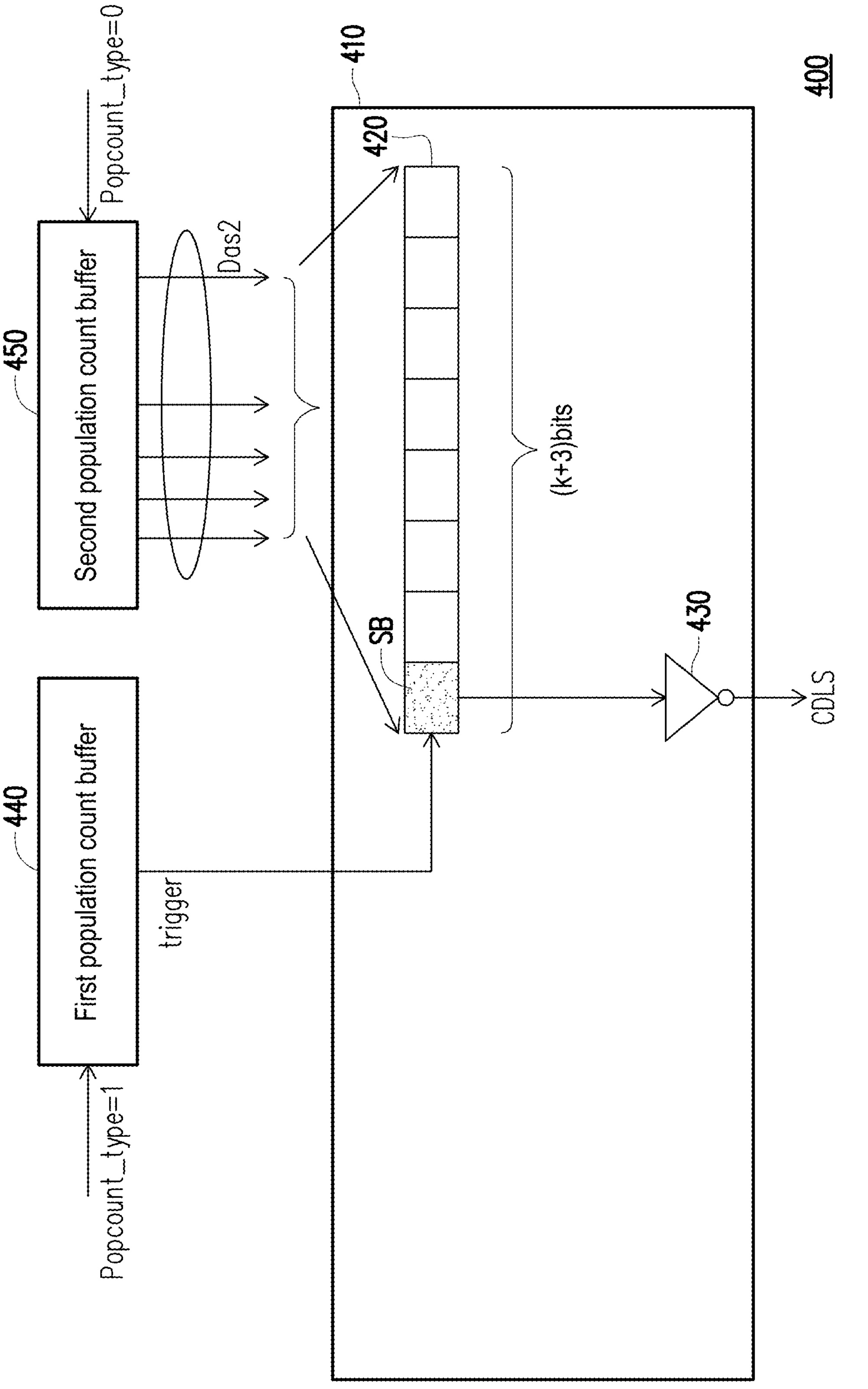
FIG. 6 is a partial structural diagram of an operation circuit according to another embodiment of the present disclosure.

The following is another embodiment to illustrate the implementation details of the operation circuit. Referring to FIG. 6, the operation circuit 400 includes multiple counter circuits 410. As shown in FIG. 6, each counter circuit 410 includes a count buffer 420 and a second inverter 430. The count buffer 420 may obtain the second analysis data Das2 from the corresponding second population count buffer 450 and directly store the second analysis data Das2. After storing the second analysis data Das2, the count buffer 420 may respond to the trigger signal trigger and start counting from the value of the second analysis data Das2 to generate the cumulative data and store the same. The trigger signal trigger comes from the first population count buffer 440. When the first population count buffer 440 counts bit 1 of the stored data, a trigger signal trigger is generated every time bit 1 is counted. Accordingly, the count buffer 420 may count the number of times a trigger signal trigger is received, and add 2 to the stored value every time the trigger signal trigger is counted starting from the value of the second analysis data Das2 to generate cumulative data.

The second inverter 430 is coupled to the count buffer 420. The second inverter 430 may invert the highest sign bit SB in the cumulative data stored in the count buffer 420 to generate activation value bit CDLS. In this way, the operation circuit 400 may combine multiple activation value bits CDLS generated by multiple counter circuits 410 to form the intermediate layer activation data Dacts.

Figure 7:
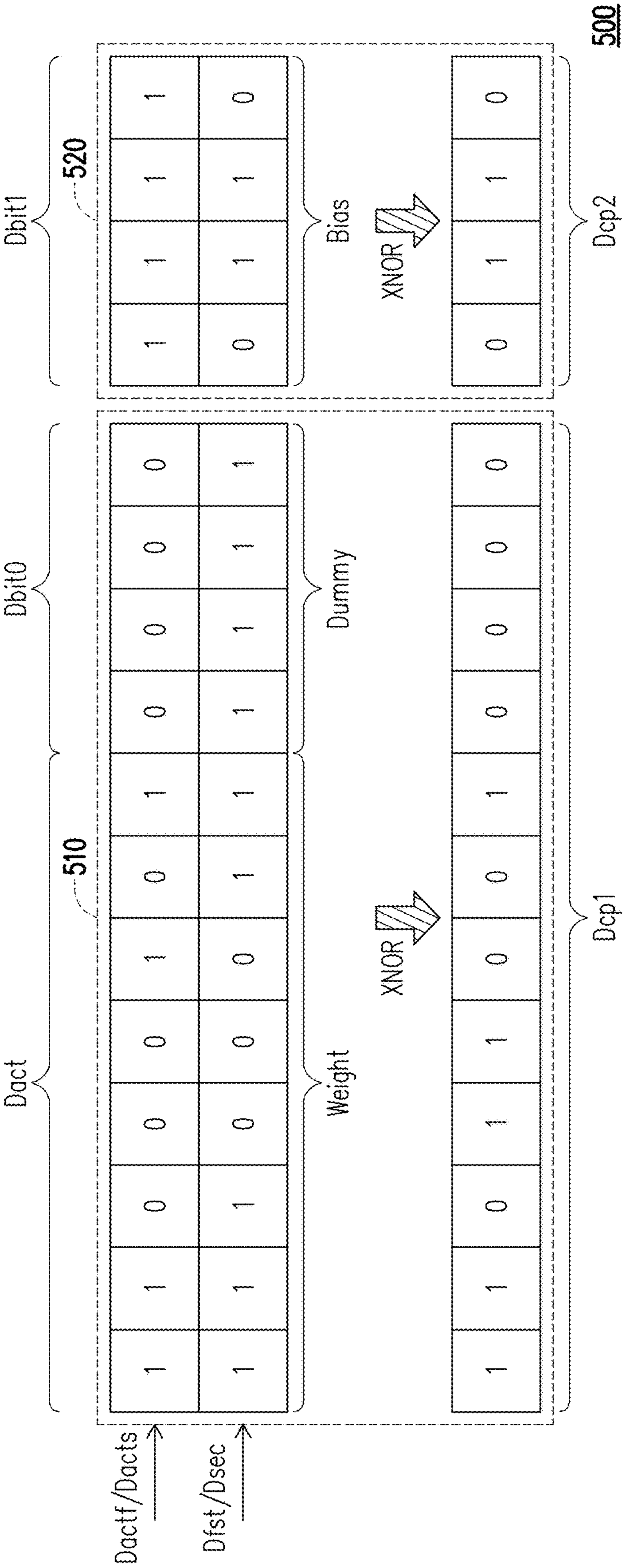
FIG. 7 is a schematic structural diagram of a page buffer group in a readout data sensor and comparator according to an embodiment of the present disclosure.

In an embodiment, since the fixed data length capacity of the buffer in the readout data sensor and comparator, when the data length of the weight data Weight to be stored in the memory cell is less than the storable data length of the buffer, the memory cells corresponding to the extra buffers will store the dummy data composed of bit 1 as the weight data. For example, as illustrated in FIG. 7, the page buffer group 500 of the readout data sensor and comparator includes a first page buffer 510 and a second page buffer 520. The first page buffer 510 receives the weight data Weight ("11100011") from the memory array 120 and receives the activation data Dact ("11000101") from the cache block 130. The second page buffer 520 receives the bias value data Bias ("0110") from the memory array 120 and receives the bit data Dbit1 composed of bit 1 from the cache block 130.

Since the data length (8 bits) of the weight data Weight and the activation data Dact is less than the data length (12 bits) that the first page buffer 510 can store, the first page buffer 510 receives the dummy data Dummy composed of bit 1 stored in the corresponding memory cell in the remaining storage position of the weight data Weight, and the remaining storage positions of the activation data Dact input bit data Dbit0 composed of bit 0.

The page buffer group 500 of the readout data sensor and comparator may perform an XNOR operation, generating the first comparative data Dcp1 ("110110010000") in the first page buffer 510 and generating the second comparative data Dcp2 ("0110") in the second page buffer 520. Consequently, the comparison results obtained from performing the XNOR operation between the dummy data Dummy and the bit data Dbit0 are all bit 0, which will not affect the subsequent counting results of bit 1. This approach also maintains design flexibility. Additionally, the bit data Dbit0 and Dbit1 may originate from an input parser.

Furthermore, as the number of nodes in each hidden layer of a binary neural network may vary, the data length required to be stored in each buffer in the memory device for performing operations of each hidden layer may also differ. Therefore, in an embodiment, each buffer may be composed of one or more buffer units with fixed data lengths. When performing operations for each hidden layer, the number of buffer units constituting each buffer may be reconfigured to accommodate the data length required for the buffer in the operation of each hidden layer.

Figure 8:
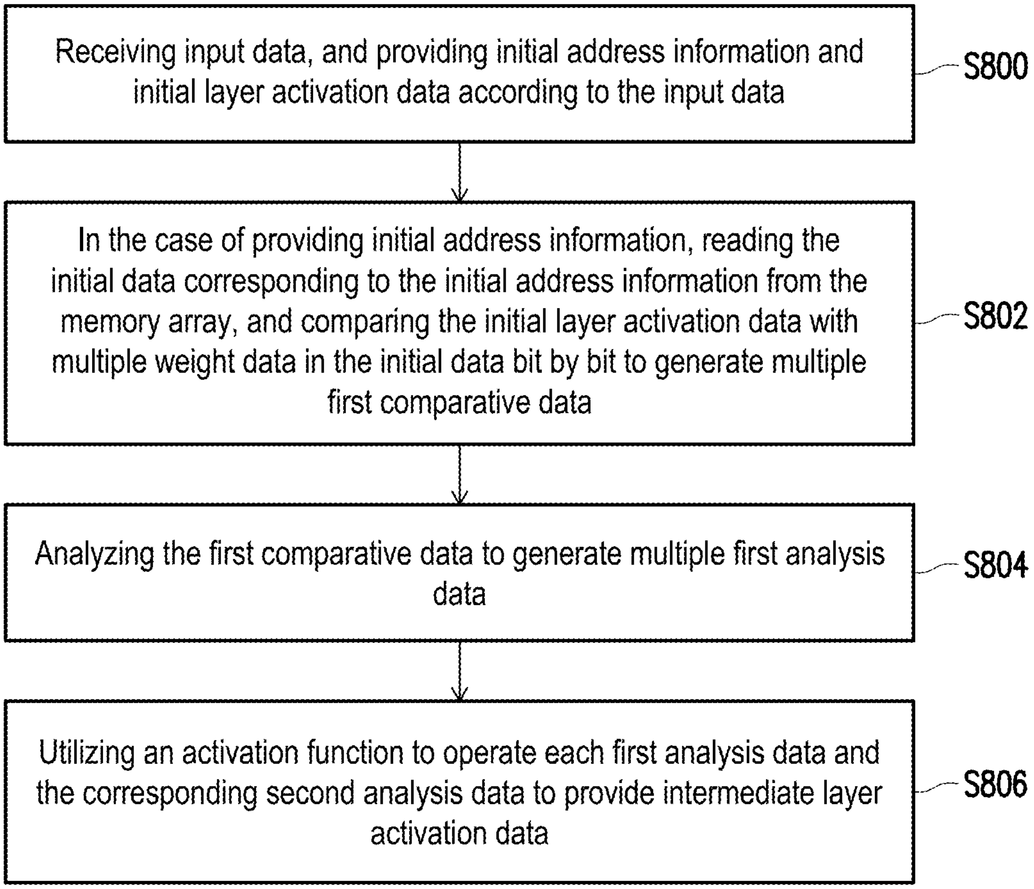
FIG. 8 is a step flow chart of an in-memory computing method according to an embodiment of the present disclosure.

Please refer to FIG. 8. In this embodiment, the in-memory computing method includes the following steps: receiving input data, and providing initial address information and initial layer activation data according to the input data (step S800); in the case of providing initial address information, reading the initial data corresponding to the initial address information from the memory array, and comparing the initial layer activation data with multiple weight data in the initial data bit by bit respectively to generate multiple first comparative data (step S802); analyzing the first comparative data to generate multiple first analysis data (step S804); and utilizing an activation function to operate each first analysis data and the corresponding second analysis data to provide intermediate layer activation data (step S806). For implementation details of the above steps S800 to S806, reference may be made to the embodiments of FIG. 1 to FIG. 7 and will not be described again here.

To sum up, the memory device and in-memory computing method of the present disclosure not only utilize existing reading mechanisms to read weights and activation values but also employ existing readout data sensor and comparator and error bit detector to perform bit-by-bit comparisons and population count calculations. Consequently, without necessitating substantial redesign of existing memory structures, the present disclosure effectively implements operations related to binary neural networks within the memory device itself. This approach not only significantly reduces the time required for computations but also offers the advantage of lowering design costs.

What is claimed is:

1. A memory device, comprising:

an input parser, configured to receive an input data and providing initial address information and an initial layer activation data based on the input data;

a memory array, coupled to the input parser;

a readout data sensor and comparator, coupled to the input parser and the memory array, and configured to, in a case that the initial address information is provided by the input parser, read an initial data corresponding to the initial address information from the memory array, and compare the initial layer activation data with a plurality of weight data in the initial data bit by bit respectively to generate a plurality of first comparative data;

an error bit detector, coupled to the readout data sensor and comparator, and configured to analyze the plurality of first comparative data to generate a plurality of first analysis data; and an operation circuit, coupled to the error bit detector and the input parser, and configured to use an activation function to operate each of the plurality of first analysis data and a corresponding second analysis data to provide an intermediate layer activation data to the input parser.

2. The memory device according to claim 1, wherein the input parser sets an initial value of a layer count value to 1, whenever the intermediate layer activation data is received, the input parser increments the layer count value, and then determines whether the layer count value is greater than a total number of hidden layers, when the layer count value is not greater than the total number of the hidden layers, the input parser provides intermediate address information corresponding to the layer count value.

3. The memory device according to claim 2, wherein when the layer count value is greater than the total number of the hidden layer, the input parser utilizes a current intermediate layer activation data as an output data.

4. The memory device according to claim 2, wherein in a case that the intermediate address information is provided by the input parser, the readout data sensor and comparator reads an intermediate data corresponding to a current intermediate address information from the memory array, and compares a current intermediate layer activation data with a plurality of weight data in the intermediate data bit by bit respectively to generate the plurality of first comparative data.

5. The memory device according to claim 4, wherein the readout data sensor and comparator comprises:

a plurality of page buffer groups, wherein each of the plurality of page buffer groups comprises a first page buffer and a second page buffer, the first page buffer is configured to store the corresponding weight data and the initial layer activation data or the intermediate layer activation data, and the stored data is compared bit by bit to generate the corresponding first comparative data, and the second page buffer is configured to store a bias value data in the initial data or the intermediate data and a bit data composed of bit 1, and the stored data is compared bit by bit to generate a second comparative data.

6. The memory device according to claim 1, wherein the error bit detector comprises:

a plurality of population count buffer groups, wherein each of the plurality of population count buffer groups comprises a first population count buffer and a second population count buffer, the first population count buffer is configured to store the corresponding first comparative data, and bit 1 of the stored first comparative data is counted according to a first configuration flag to generate the corresponding first analysis data, the second population count buffer is configured to store a second comparative data, and output the stored second comparative data as the corresponding second analysis data according to a second configuration flag.

7. The memory device according to claim 1, wherein the operation circuit comprises a plurality of adder circuits, and each of the plurality of adder circuits comprises:

a summand buffer, configured to store the corresponding first analysis data with a left shift of 1 bit;

an addend buffer, configured to store the corresponding second analysis data;

a sum buffer, coupled to the summand buffer and the addend buffer, and configured to add a data stored in the summand buffer and a data stored in the addend buffer to obtain a cumulative data and store the cumulative data; and a first inverter, coupled to the sum buffer, and configured to invert a highest sign bit in the cumulative data to generate an activation value bit.

8. The memory device according to claim 7, wherein the operation circuit combines a plurality of the activation value bits generated by the plurality of adder circuits to form the intermediate layer activation data.

9. The memory device according to claim 1, wherein the operation circuit comprises a plurality of counter circuits, and each of the plurality of counter circuits comprises:

a count buffer, configured to, after storing the corresponding second analysis data, start counting from a value of the second analysis data in response to a trigger signal to generate a cumulative data and store the cumulative data; and a second inverter, coupled to the count buffer, and configured to invert a highest sign bit in the cumulative data to generate an activation value bit.

10. The memory device according to claim 1, further comprising:

a cache block, coupled between the input parser and the readout data sensor and comparator, and configured to store the initial layer activation data or the intermediate layer activation data, and provide the initial layer activation data or the intermediate layer activation data to the readout data sensor and comparator.

11. An in-memory computing method, comprising:

receiving an input data, and providing initial address information and an initial layer activation data according to the input data;

in a case of providing the initial address information, reading an initial data corresponding to the initial address information from a memory array, and comparing the initial layer activation data with a plurality of weight data in the initial data bit by bit respectively to generate a plurality of first comparative data;

analyzing the plurality of first comparative data to generate a plurality of first analysis data; and utilizing an activation function to operate each of the plurality of first analysis data and a corresponding second analysis data to provide an intermediate layer activation data.

12. The in-memory computing method according to claim 11, further comprising:

setting an initial value of a layer count value to 1;

whenever the intermediate layer activation data is received, incrementing the layer count value;

determining whether the layer count value is greater than a total number of hidden layers; and when the layer count value is not greater than the total number of the hidden layers, providing intermediate address information corresponding to the layer count value.

13. The in-memory computing method according to claim 12, further comprising:

when the layer count value is greater than the total number of the hidden layer, utilizing a current intermediate layer activation data as an output data.

14. The in-memory computing method according to claim 12, further comprising:

in a case of providing the intermediate address information, reading an intermediate data corresponding to a current intermediate address information from the memory array, and comparing a current intermediate layer activation data with a plurality of weight data in the intermediate data bit by bit respectively to generate the plurality of first comparative data.

15. The in-memory computing method according to claim 14, wherein the comparing bit by bit to generate the plurality of first comparative data comprises:

storing the corresponding weight data and the initial layer activation data or the intermediate layer activation data to a first page buffer; and comparing the data stored in the first page buffer bit by bit to generate the corresponding first comparative data, wherein the in-memory computing method further comprises:

storing a bias value data in the initial data or the intermediate data and a bit data composed of bit 1 to a second page buffer; and comparing the data stored in the second page buffer bit by bit to generate a second comparative data.

16. The in-memory computing method according to claim 11, wherein the analyzing the plurality of first comparative data and generating the plurality of first analysis data comprises:

storing the corresponding first comparative data to a first population count buffer; and counting bit 1 of the first comparative data stored in the first population count buffer according to a first configuration flag to generate the corresponding first analysis data, wherein the in-memory computing method further comprises:

storing a second comparative data to a second population count buffer; and outputting the second comparative data stored in the second population count buffer as the corresponding second analysis data according to a second configuration flag.

17. The in-memory computing method according to claim 11, wherein the utilizing the activation function to operate each of the plurality of first analysis data and the corresponding second analysis data comprises:

storing the corresponding first analysis data with a left shift of 1 bit to a summand buffer;

storing the corresponding second analysis data to an addend buffer;

adding a data stored in the summand buffer and a data stored in the addend buffer to obtain a cumulative data; and inverting a highest sign bit in the cumulative data to generate an activation value bit.

18. The in-memory computing method according to claim 17, wherein the providing the intermediate layer activation data comprises:

combining a plurality of the generated activation value bits to form the intermediate layer activation data.

19. The in-memory computing method according to claim 11, wherein the utilizing the activation function to operate each of the plurality of first analysis data and the corresponding second analysis data comprises:

after storing the corresponding second analysis data, start counting from a value of the second analysis data in response to a trigger signal to generate a cumulative data; and inverting a highest sign bit in the cumulative data to generate an activation value bit.

* * * * *